United States Patent
Carlson, III (10) Patent No.: US 11,597,479 B1
(45) Date of Patent: Mar. 7, 2023

(54) TESTING DEVICE AND METHOD FOR TESTING A DRIVE TRAIN OR COMPONENTS WITHIN A MARINE PROPULSION SYSTEM HAVING AT LEAST ONE DRIVEN SHAFT

(71) Applicant: Volvo Penta Corporation, Gothenburg (SE)

(72) Inventor: Donald A. Carlson, III, Lexington, TN (US)

(73) Assignee: Volvo Penta Corporation, Gothenburg (SE)

( * ) Notice: Subject to any disclaimer, the term of this patent is extended or adjusted under 35 U.S.C. 154(b) by 17 days.

(21) Appl. No.: 17/475,547

(22) Filed: Sep. 15, 2021

(51) Int. Cl.
*B63B 79/30* (2020.01)
*G01M 17/00* (2006.01)
*B63H 1/20* (2006.01)

(52) U.S. Cl.
CPC .............. *B63B 79/30* (2020.01); *B63H 1/20* (2013.01); *G01M 17/00* (2013.01)

(58) Field of Classification Search
CPC ........... B63B 79/30; B63H 1/20; G01M 17/00
See application file for complete search history.

(56) References Cited

U.S. PATENT DOCUMENTS

| 3,487,426 A | * | 12/1969 | Hoffmann | B63B 49/00 73/148 |
| 3,969,931 A | * | 7/1976 | Lanning | G01M 10/00 73/114.15 |
| 4,033,184 A | | 7/1977 | Christink | |
| 4,412,455 A | * | 11/1983 | Borgersen | G01L 3/242 73/862.12 |
| 4,691,560 A | | 9/1987 | Otto | |
| 5,485,759 A | * | 1/1996 | Goff | H01L 21/67781 33/522 |
| 7,223,076 B2 | | 5/2007 | Mansson | |
| 2007/0046240 A1 | * | 3/2007 | Bremsjo | B63J 99/00 318/588 |
| 2020/0332958 A1 | * | 10/2020 | Dietrich | F25D 3/10 |

* cited by examiner

*Primary Examiner* — Eric S. McCall
(74) *Attorney, Agent, or Firm* — WRB-IP PLLC (57) ABSTRACT

A testing device for testing a drive train or components within a marine propulsion system is provided and includes a first disk with a plurality of first disk depressions that faces a second disk with a plurality of second disk depressions. The first disk and the second disk are secured relative to each other so that they define a space, and a seal at outer edges of the disks is in fluid communication with the space. One of the first disk and the second disk is secured to a driven shaft. Upon rotation of the driven shaft, a load is produced due to shearing of fluid between the disks, yet no thrust is produced.

20 Claims, 7 Drawing Sheets

TESTING DEVICE AND METHOD FOR TESTING A DRIVE TRAIN OR COMPONENTS WITHIN A MARINE PROPULSION SYSTEM HAVING AT LEAST ONE DRIVEN SHAFT

BACKGROUND AND SUMMARY

The present invention relates to a testing device and method for testing a drive train or components within a marine propulsion system having at least one driven shaft and, more particularly, such a testing device and method that permits testing the drive train or components with the propulsion system under different load and rpm conditions.

When testing and servicing drive trains or components of propulsion systems of watercraft that are propelled by propellers mounted on one or more driven shafts, tests are typically performed during runs at sea.

Such testing requires a substantial amount of time and involves substantial expense and makes it difficult to modify or replace components during testing.

In some circumstances, instead of making test runs at sea, a watercraft is moored to a dock and the engine is operated without moving the watercraft. As the turning propeller creates substantial thrust, this testing technique is quite difficult to perform and generally only permits testing at low engine speeds.

Certain devices have been created to permit testing of drive trains and propulsion system components of a watercraft that is out of the water or moored while its propeller is submerged in a service tank. Because the propeller still creates a substantial amount of thrust while in the tank, these devices can also be quite difficult to manage.

It is desirable to provide a testing device and method for drive trains or components within a marine propulsion system having at least one driven shaft that avoids the need for performing testing at sea and reduces risks associated with testing while moored or with service tanks. It is also desirable to provide such a testing device and method that produces no thrust.

According to an aspect of the present invention, a testing device for testing a drive train or components within a marine propulsion system having at least one driven shaft is provided and comprises a first disk comprising a first disk outer side and a first disk inner side, a first hole extending through a center of the first disk from the first disk outer side to the first inner side, and a plurality of first disk depressions extending radially toward a first radially outer edge of the first disk, a second disk comprising a second disk outer side and a second disk inner side, a second hole extending through a center of the second disk from the second disk outer side to the second inner side, and a plurality of second disk depressions extending radially toward a second radially outer edge of the second disk, and means for securing the first disk and the second disk relative to each other such that the first disk inner side faces the second disk inner side and the first disk inner side and the second disk inner side define a space and one of the first disk and the second disk is secured to a respective one driven shaft of the at least one driven shaft, wherein a first portion of the first disk inner side radially inward of the first radially outer edge and a second portion of the second disk inner side radially inward of the second radially outer edge define a seal in fluid communication with the space.

According to another aspect of the invention, a method for testing a drive train or components within a marine propulsion system having at least one driven shaft comprises securing a first disk on one output shaft of the at least one driven shaft, the first disk comprising a first disk outer side and a first disk inner side, and a plurality of first disk depressions extending radially toward a first radially outer edge of the first disk on the first disk inner side, positioning a second disk comprising a second disk outer side and a second disk inner side relative to the first disk, the first disk and the second disk being coaxial, the second disk comprising a plurality of second disk depressions extending radially toward a second radially outer edge of the second disk on the second disk inner side; securing the first disk and the second disk relative to each other such that the first disk inner side faces the second disk inner side and the first disk inner side and the second disk inner side define a space, and such that a first portion of the first disk inner side radially inward of the first radially outer edge and a second portion of the second disk inner side radially inward of the second radially outer edge define a seal in fluid communication with the space, turning the one output shaft in a first rotational direction, causing fluid to enter into a central region of the space while turning the output shaft in the first rotational direction, and draining fluid that is caused to enter into the space through the seal.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
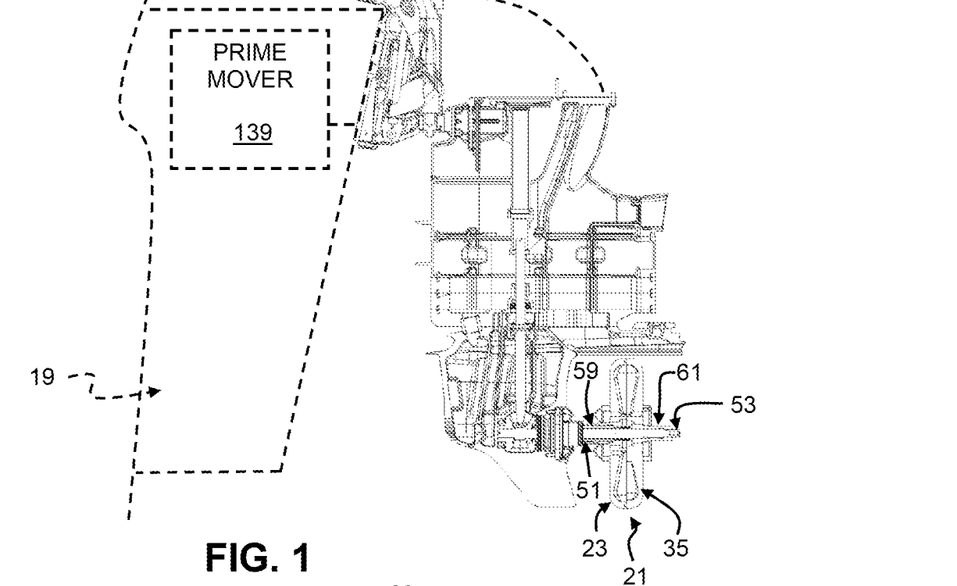
FIG. 1 is a partially cross-sectional view of a watercraft provided with a testing device according to an aspect of the present invention.
Figure 2A:
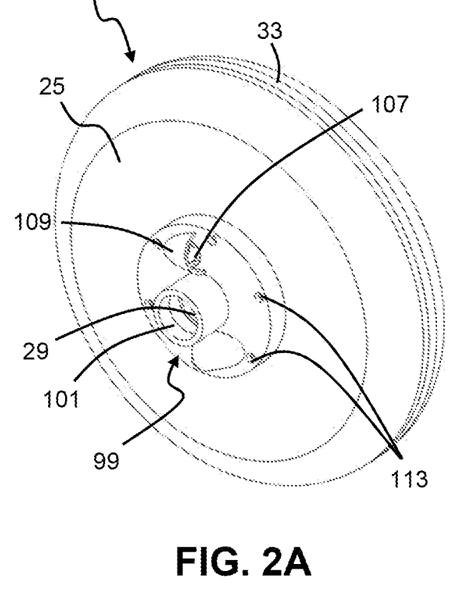
FIGS. 2A and 2B are perspective views of an outer and an inner side, respectively, of a disk forming part of the testing device according to an aspect of the present invention.

FIG. 1 shows a watercraft 19 provided with a testing device 21 for testing a drive train or components within a marine propulsion system where one or more rotating shafts, such as propeller shafts, are intended to rotate in a fluid such as water. The device 21 comprises a first disk 23 shown in, for example, FIGS. 2A and 2B and comprising a first disk outer side 25 (FIG. 2A) and a first disk inner side 27 (seen in FIG. 2B), a first hole 29 extending through a center of the first disk from the first disk outer side to the first inner side, and a plurality of first disk depressions 31 extending radially toward a first radially outer edge 33 of the first disk. The device 21 further comprises a second disk 35 comprising, as seen, for example, in FIG. 3, a second disk outer side 37 and a second disk inner side 39 (which can be identical or, more typically, similar to the first disk inner side shown in FIG. 2B), a second hole 41 extending through a center of the second disk from the second disk outer side to the second inner side, and a plurality of second disk depressions 43 extending radially toward a second radially outer edge 45 of the second disk. When the first and second disks 23 and 35 are rotated relative to each other, a load is produced as the result of shearing fluid flowing between the disks, yet no thrust is produced.

Figure 4:
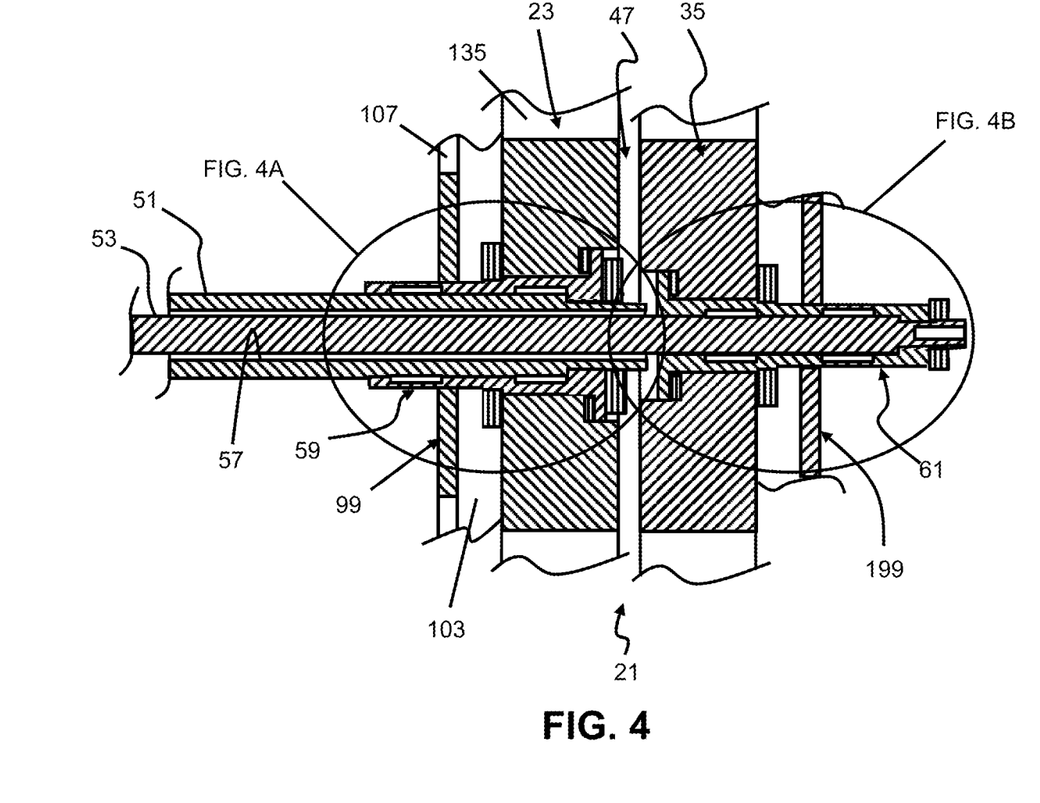
FIG. 4 is a schematic, cross-sectional view of a testing device according to an aspect of the present invention mounted on contra-rotating shafts of a drive train or marine propulsion system.

As shown schematically in FIG. 4, means is provided for securing the first disk 23 and the second disk 35 relative to each other such that the first disk inner side 27 faces the second disk inner side 39 and the first disk inner side and the second disk inner side define a space 47. The securing means can include a variety of structures, such as one or more of bolts, set screws, cotter pins, splines, and the like.

The device 21 is particularly useful in connection with a contra-rotating shaft arrangement drive train or marine propulsion system as shown in FIG. 1 (and as shown schematically in FIG. 4) wherein the first disk 23 is mounted or adapted to be secured to an outer propeller shaft 51 of the contra-rotating shaft arrangement of a type that extends outwardly relative to the hull 55 of a watercraft 19 and the second disk 35 is mounted or adapted to be secured to an inner propeller shaft 53 of the contra-rotating shaft arrangement that is coaxial with the outer propeller shaft and extends through a hole 57 in the outer propeller shaft. In such a contra-rotating shaft arrangement, any suitable means, such as bolts, set screws, cotter pins, splines, and the like, can be used to secure the first disk 23 and the second disk 35 to the outer propeller shaft 51 and the inner propeller shaft, respectively. An illustrative suitable securing means is shown in detail in FIG. 4 where first and second splined nut assemblies 59 and 61 are provided to mount the first disk 23 and the second disk 35, respectively, relative to the outer propeller shaft 51 and the inner propeller shaft, respectively. Contra-rotating shaft drive arrangements are known for use in watercraft and are available from sources such as Volvo Penta AB, Göteborg, Sweden.

Figure 5:
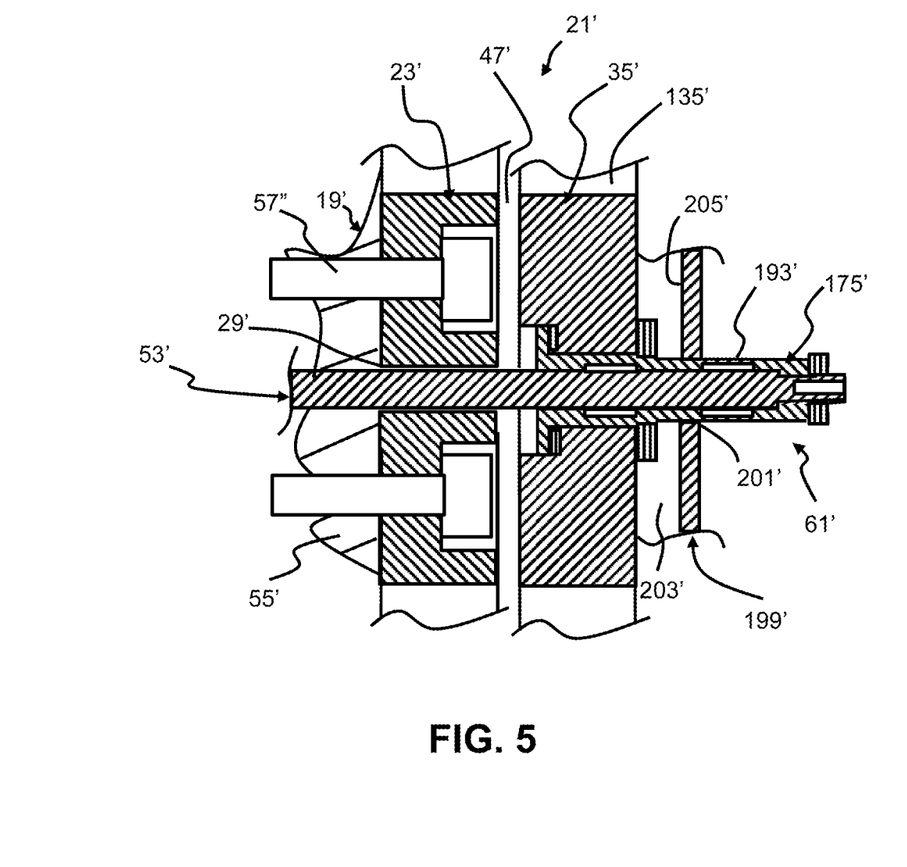
FIG. 5 is a schematic, cross-sectional view of a testing device according to an aspect of the present invention mounted on a shaft of a single-shaft drive train or marine propulsion system.

Alternatively, as seen in connection with the watercraft 19' having a single propeller shaft 53' FIG. 5, the device 21' can be modified such that one of the first disk 23' or the second disk 35' can be fixed or adapted to be fixed in place by any suitable means (showing a first disk 23' non-rotatably fixed to a hull 55' (or some other structure) of the watercraft 19' by means such as bolts 57") and the other one of the first disk and the second disk can be mounted or adapted to be secured to the single propeller shaft (showing a second disk 35' secured to a propeller shaft 53' by a splined nut assembly 61'. The splined nut arrangement 61' can be the substantially the same as the splined nut assembly 61 and the description of the splined nut assembly 61 shall be understood to be the same as the description of the splined nut assembly 61' except where otherwise noted. In the embodiment illustrated in FIG. 5, the single propeller shaft 53' extends through a first hole 29' in the first disk 23'.

As seen in FIG. 4, the first and second splined nut assemblies 59 and 61 secure the first disk 23 and the second disk 35, to the outer shaft 51 and the inner shaft 53, respectively. It will be appreciated that other structures can be provided for securing the first disk 23 and the second disk 35 to the outer shaft 51 and the inner shaft 53.

Figure 4A:
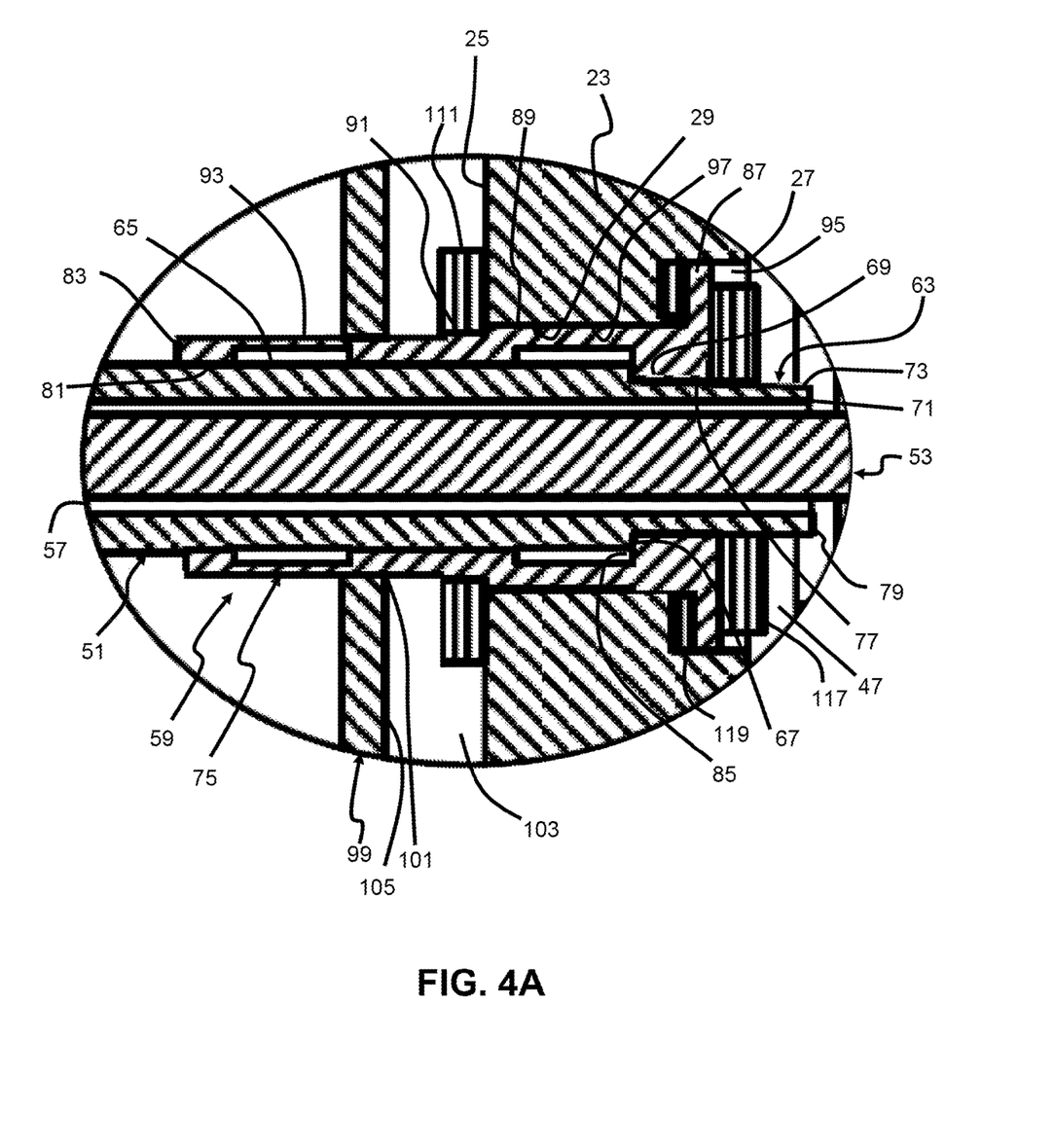
FIG. 4A is an enlarged view of region 4A of FIG. 4.

In the embodiment seen in FIG. 4A, typically, an end region 63 of the outer shaft 51 is somewhat reduced in diameter relative to a main region 65 of the outer shaft. A transition region 67 between the end region 63 and the main region 65 may be a sharp transition or a sloped transition. The end region 63 has an externally splined portion 69, the splines of which may be parallel to a length of the outer shaft but is often provided with a more helical shape. The distal end 71 of the end region 63 is typically provided with an externally threaded portion 73, as well as the spline, where any helix of the splined portion has a substantially greater helix angle than the threaded portion.

A first nut 75 of the splined nut assembly 59 has an internally splined portion 77 at a first end 79 of the first nut, the internally splined portion having a first internal diameter, and a second internal portion 81 that can extend to a second end 83 of the first nut, the second internal portion having a second internal diameter larger than the first internal diameter. The first nut 75 is able to be slid along the outer shaft 51 so that the internally splined portion 77 engages with the externally splined portion 69 and a transition region 85 between the internally splined portion 77 and the larger internal diameter second portion 81 abuts against the transition region 67 on the output shaft and limits axial movement of the first nut 75 in a direction away from the distal end 71 of the end region 63 of the outer shaft 51. The second internal diameter of the second portion 81 of the first nut 75 is sufficiently larger in diameter than and sized to receive the main region 65 of the outer shaft 51 with minimal radial play.

The first nut 75 has an exterior flange 87 at the first end 79 of the first nut, and, in the direction of the second end of the first nut, a non-circular portion 89 behind the flange, an externally threaded portion 91, and a second end portion 93 having a smaller diameter than the externally threaded portion. The first hole 29 in the first disk 23 has a first portion 95 closest to the first disk inner side 27, the first portion 95 being of sufficient size to receive the flange 87, and a second portion 97 of smaller size than the first portion and of the flange 87 and having a non-circular shape corresponding to and adapted to receive the non-circular portion 89 of the first nut so that the first disk is non-rotatable relative to the first nut.

An (optional) inlet cover 99 has a hole 101 therein for receiving the second end portion 93 of the first nut 75. The inlet cover 99 can be in the form of a disk having a cavity 103 on an inner side 105 thereof. Inlet holes 107 (FIGS. 2A, 3, and 4) are provided through the inlet cover 99 through which fluid is adapted to pass.

Cup-shaped members 109 (FIGS. 2A and 3) may be attached to an outer side of the inlet cover 99 to function as a pump to facilitate causing fluid to enter the cavity 103 through the inlet holes 107 when the inlet cover 99 is rotated together with the first nut 175 and the outer shaft 51. The cup-shaped members 109 are typically in the form of a conduit having a first end that faces in a direction that is non-perpendicular to an axis of the first disk 23 and a second end by a corresponding inlet hole 107, the conduit being in fluid communication with the at least one fluid pumping hole 135 in the first disk 23 via the cavity 103.

Figure 3:
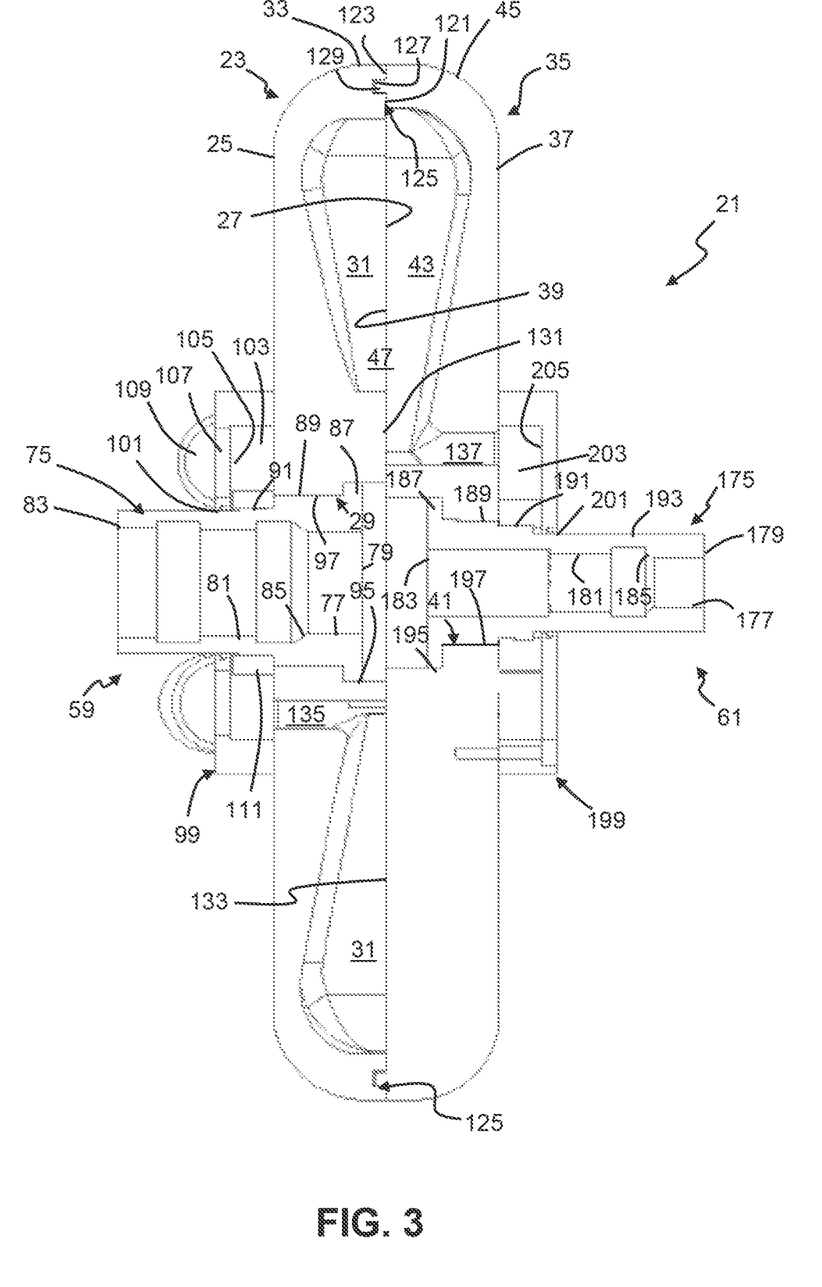
FIG. 3 is a cross-sectional view of components of a testing device according to an aspect of the present invention.

The cavity 103 can function as a manifold for fluid that will enter the space 47 between the first disk 23 and the second disk 35 through one or more of the fluid pumping holes 135 in the first disk. If the inlet cover is not provided, optional cup shaped members (not shown) may be provided by the fluid pumping holes 135 on the first disk 23 and may facilitate pumping of fluid into the space. Alternatively, no cup-shaped members may be provided, and fluid may be drawn, via a siphoning action, through fluid pumping holes 135 in the first disk 23 as the result of centrifugal force resulting from rotation of the first disk 23 and the second disk 35 (or, if only one disk rotates, the rotation of the rotating disk).

Figure 6:
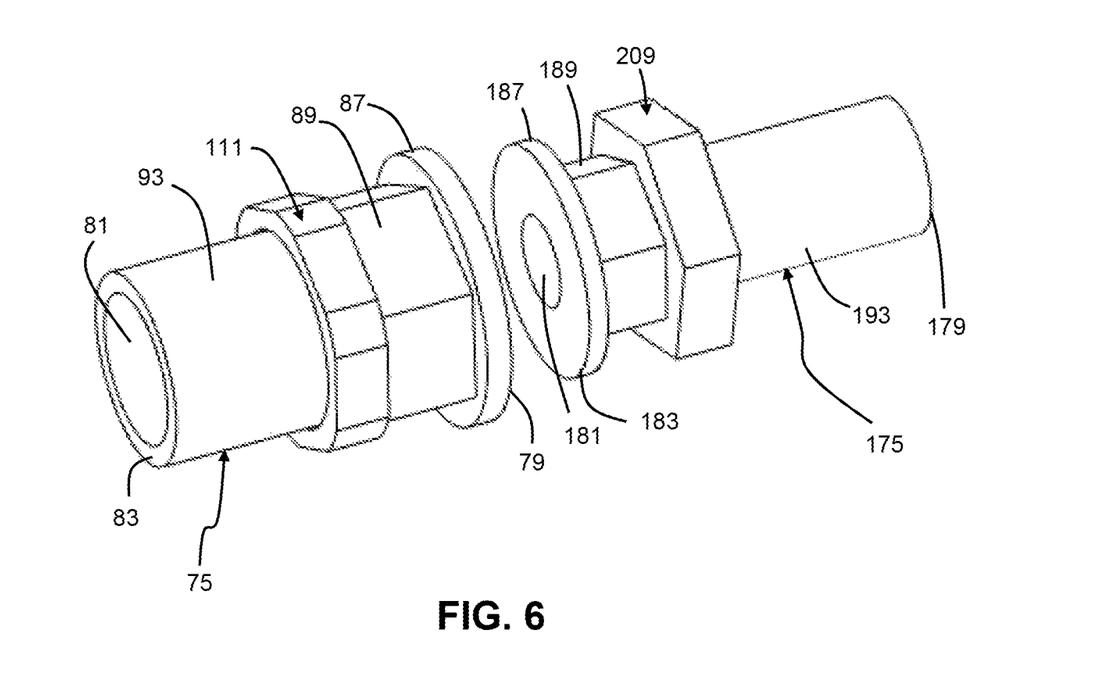
FIG. 6 is a perspective view of first and second nut components of a testing device according to an aspect of the present invention.

In the embodiment of FIG. 4, before sliding the first nut 75 over the outer shaft 51, the first nut is inserted through the first hole 29 in the first disk 23 so that the flange 87 of the first nut abuts against a wall of the first portion 95 and is prevented from entering the smaller second portion 97, and so that the non-circular portion 89 of the first nut is received in the non-circular second portion such that the first nut and the disk are non-rotatable relative to each other. A first securing nut 111 is screwed onto the externally threaded portion 91 of the first nut 75 to secure the first nut axially and the first disk 23 axially relative to each other. FIG. 6 shows the first nut 75 with the securing nut 111 attached over the externally threaded portion (not shown) apart from the outer shaft 51.

The inlet cover 99 is mounted relative to the first nut 75 by inserting the second end portion 93 of the first nut through the hole 101 on the inlet cover. The inlet cover 99 can be secured in position relative to the first nut 75 by bolts 113 (FIG. 2A) through holes (not shown) in the inlet cover that bolt the inlet cover to the first disk 23, such by mating with internally threaded holes (not shown) in the first disk.

After attaching the inlet cover 99 and the first disk 23 to the first nut 75 in a suitable fashion the first nut, together with the first disk and the inlet cover, is slid over the outer shaft 51 so that the externally splined portion 69 of the outer shaft and the internally splined portion 77 engage to prevent rotation of the first nut relative to the outer shaft, and the transition region 67 on the outer shaft abuts against the transition region 85 in the first nut to limit axial movement of the nut relative to the outer shaft in a direction away from the distal end 71 of the end region 63 of the outer shaft. Threads of a lock nut 117 mate with threads of the externally threaded portion 73 of the outer shaft 51 and prevent movement of the nut toward the distal end 71 of the end region 63.

A shim 119 can be provided between the flange 87 of the first nut 75 and the wall of the first portion 95 of the first disk 23 to adjust a position of the first disk along the first nut. Increasing or decreasing the size of the shim 119 can increase or decrease, respectively, the size of the space 47 between the first disk inner side 27 and the second disk inner side 39 of the second disk 35, as well as increasing or decreasing, respectively, the size of a seal 125 radially inwardly of the first and second radially outer edges 33 and 45, respectively, and in fluid communication with the space 47. It is also possible to provide no shim.

Figure 4B:
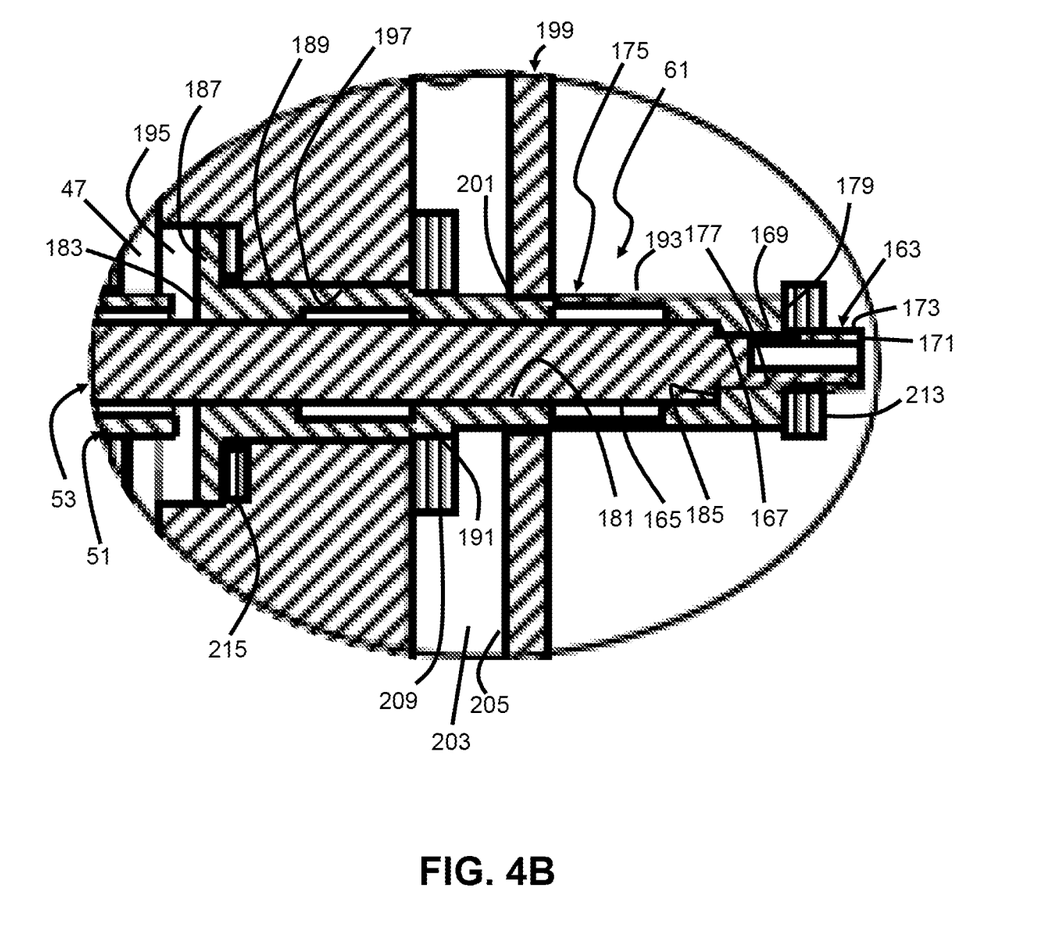
FIG. 4B is an enlarged view of region 4B of FIG. 4.

Typically, as seen in FIG. 4B, an end region 163 of the inner shaft 53 is somewhat reduced in diameter relative to a main region 165 of the inner shaft. A transition region 167 between the end region 163 and the main region 165 may be a sharp transition or a sloped transition. The end region 163 has an externally splined portion 169 which may be parallel to a length of the inner shaft but is often provided with a more helical shape. The distal end 171 of the end region 163 is typically provided with an externally threaded portion 173, as well as the spline, where any helix of the splined portion has a substantially greater helix angle than the threaded portion.

A second nut 175 has an internally splined portion 177 at a first end 179 of the second nut, the internally splined portion having a first internal diameter, and a second internal portion 181 that can extend to a second end 183 of the second nut, the second internal portion having a second internal diameter larger than the first internal diameter. The second nut 175 is able to be slid along the inner shaft 53 so that the internally splined portion 177 engages with the externally splined portion 169 and a transition region 185 between the internally splined portion 177 and the larger internal diameter second portion 181 abuts against the transition region 167 on the output shaft and limits axial movement of the second nut 175 in a direction away from the distal end 171 of the end region 163 of the inner shaft 53. The second internal diameter of the second portion 181 of the second nut 175 is sufficiently larger in diameter than and sized to receive the main region 65 of the inner shaft 53 with minimal radial play.

The second nut 175 has an exterior flange 187 at the second end 183 of the second nut, and, in the direction toward the first end 179 of the second nut, a non-circular portion 189 behind the flange, an externally threaded portion 191, and a second end portion 193 having a smaller diameter than the externally threaded portion. The second hole 41 in the second disk 35 has a first portion 195 closest to the second disk inner side 39, the first portion 195 being of sufficient size to receive the flange 187, and a second portion 197 of smaller size than the first portion and of the flange 187 and having a non-circular shape corresponding to and adapted to receive the non-circular portion 189 of the second nut so that the second disk is non-rotatable relative to the second nut.

An (optional) cover 199 has a hole 201 therein for receiving the second end portion 193 of the second nut 175. The cover 199 can be in the form of a disk having a cavity 203 on an inner side 205 thereof.

Before sliding the second nut 175 over the inner shaft 53, the second nut is inserted through the second hole 41 in the second disk 35 so that the flange 187 of the second nut abuts against a wall of the first portion 195 and is prevented from entering the smaller second portion 197, and so that the non-circular portion 189 of the second nut is received in the non-circular second portion such that the second nut and the disk are non-rotatable relative to each other. A second securing nut 209 is screwed onto the externally threaded portion 191 of the second nut 175 to secure the second nut axially and the second disk 35 axially relative to each other. FIG. 6 shows the second nut 175 with the securing nut 209 attached over the externally threaded portion (not shown) apart from the inner shaft 53.

The cover 199, if provided, is mounted relative to the second nut 175 by inserting the second end portion 193 of the second nut through the hole 201 on the inlet cover. The cover 99 can be secured in position relative to the second nut 175 by bolts (not shown) through holes in the cover that bolt the cover to the second disk 35, such by mating with internally threaded holes (not shown) in the second disk.

After attaching the inlet cover 199, if provided, and the second disk 35 to the second nut 175 in a suitable fashion the second nut, together with the second disk and the inlet cover, is slid over the inner shaft 53 so that the externally splined portion 169 of the inner shaft and the internally splined portion 177 engage to prevent rotation of the second nut relative to the inner shaft, and the transition region 167 on the inner shaft abuts against the transition region 185 in the second nut to limit axial movement of the second nut relative to the inner shaft in a direction away from the distal end 171 of the end region 163 of the inner shaft. Threads of a lock nut 213 mate with threads of the externally threaded portion 173 of the inner shaft 53 and prevent movement of the second nut toward the distal end 171 of the end region 163.

A shim 215 can be provided between the flange 187 of the second nut 175 and the wall of the first portion 195 of the second disk 35 to adjust a position of the second disk along the second nut. Increasing or decreasing the size of the shim 215 can increase or decrease, respectively, the size of the space 47 between the second disk inner side 27 and the second disk inner side 39 of the second disk 35, as well as increasing or decreasing, respectively, the size of the seal 125. It is also possible to provide no shim.

The splined nut assemblies 59 and 61 with shims 119 and 215 can thus constitute securing means that are adapted to secure the first disk 23 and the second disk 35 relative to each other at a range of distances so that a volume of the space 47 is adjustable by removing or providing the shims or changing the thickness of the shims.

In the embodiment of FIG. 5 where only the second disk 35' turns, an inlet cover 199' can be provided with a hole 201' for receiving a second end portion 193' of a second nut 175'. The inlet cover 199' can be in the form of a disk having a cavity 203' on an inner side 205' thereof. Inlet holes (not shown) can be provided through the inlet cover 199' through which fluid is adapted to pass. Cup shaped members (not shown) like the cup-shaped members 109 that may be provided on the inlet cover 99 may be attached to an outer side of the inlet cover 199' to function as a pump to facilitate causing fluid to enter the cavity 203' through the inlet holes 207' when the inlet cover 199' is rotated together with the second nut 175'. The cavity 103 can function as a manifold for fluid that will enter the space 47' between the first disk 23' and the second disk 35' through one or more of the fluid pumping holes 135' in the second disk. If the inlet cover is not provided, optional cup shaped members (not shown) may be provided by the fluid pumping holes 135' on the second disk 35' and may facilitate pumping of fluid into the space. Alternatively, no cup-shaped members may be provided, and fluid may be drawn, via a siphoning action, through fluid pumping holes 135' in the second disk 23 as the result of centrifugal force resulting from rotation of the second disk 35'.

Figure 7:
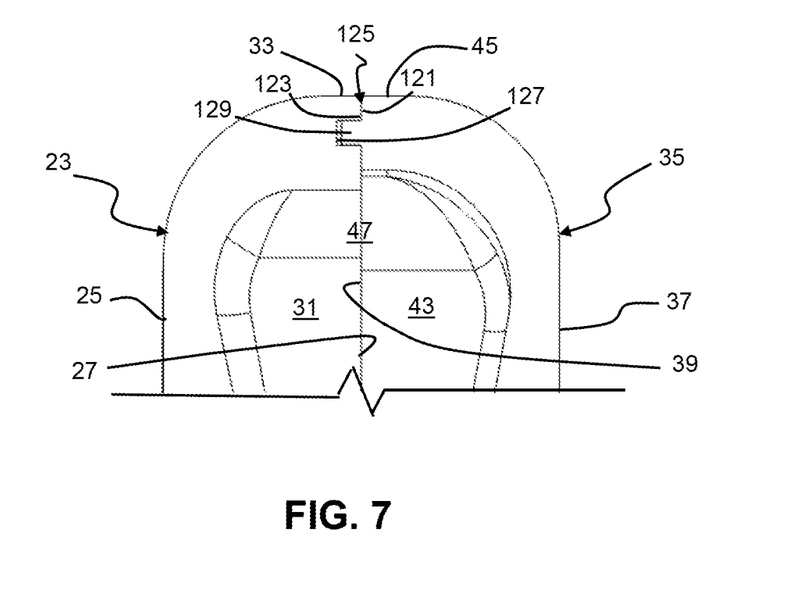
FIG. 7 is a cross-sectional view of a seal formed between disks of a testing device according to an aspect of the present invention.

As seen, for example, in FIG. 7, a first portion 121 of the first disk inner side 27 radially inward of the first radially outer edge 33 and a second portion 123 of the second disk inner side 39 radially inward of the second radially outer edge 45 define a seal 125 in fluid communication with the space 47. The seal 125 is ordinarily a labyrinth seal, such as a seal that comprises a groove 127 radially inward from an outer edge and on an inner side of one of the first disk 23 and the second disk 35, and a tongue 129 radially inward from an outer edge and on the inner side of the other one of the first disk and the second disk. It will be appreciated that other forms of labyrinth seals are possible. The seal 125 is ordinarily structured to provide resistance to flow of fluid in the space 47 when one or both of the first disk 23 and the second disk 35 are turned and fluid is caused to move toward the first and second radially outer edges 33 and 45 of the first disk and the second disk, respectively, by centrifugal force.

Figure 2B:
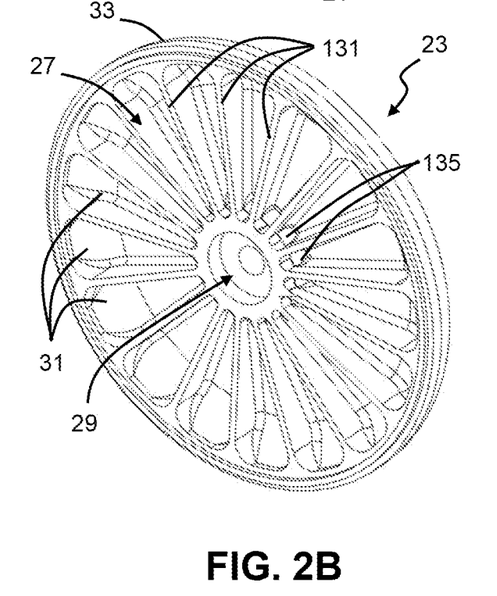

As seen in FIG. 2B, the first disk depressions 31 and the second disk depressions 43 can be teardrop-shaped, however, other shapes, such as circles, rectangles, and triangles, can be provided. Ridges 131 and 133 (FIG. 3) are provided between adjacent shapes of the first disk depressions 31 and the second disk depressions 43. When the first and second disks 23 and 35 rotate relative to each other (or one of the disks 23' and 35' of FIG. 5 rotates relative to the other, stationary disk), the ridges 131 and 133 facilitate shearing of the fluid in the space 47 and development of a load on the prime mover 139 (FIG. 1) such as a diesel engine that is configured to turn the outer and inner shafts 51 and 53 (or the single shaft of the apparatus shown in FIG. 5). The shapes of the first disk depressions 31 and the second disk depressions 43 will ordinarily be selected to facilitate maintaining a constant, solid, laminar flow of water through the depressions and the space and out to the seal 125.

The first disk depressions 31 and the second disk depressions 43 extend radially inward toward the first hole 29 and the second hole 41 in the first disk 23 and the second disk 35, respectively, to at least radially outermost points of one or more fluid pumping holes 135 in the first disk 23 (and an optional hole 137 in the second disk 27) and the seal 125, and radially outwardly to at least the radially innermost portion of the seal 125. The fluid pumping holes 135 and the hole 137 (if provided) are disposed radially outward of the first hole 29 and the second hole 41 on the first disk 23 and the second disk 35, respectively. The fluid pumping holes 135 provide for flow communication between the cavity 103 in the inlet cover 99 and the space 47 between the first disk 23 and the second disk 35. Ordinarily, there is a different number of first disk depressions 31 than second disk depressions 43 to reduce the possibility of harmonic vibration when the first disk 23 and the second disk 35 rotate relative to each other (or, if only one disk rotates and the other is rotationally fixed, when the rotating disk rotates relative to the non-rotating disk). In a presently preferred embodiment, there are eighteen first disk depressions 31 and seventeen second disk depressions 43. Ordinarily, at least one fluid pumping hole 135 corresponds to each of the first disk depressions 31.

Dimensions of components of a testing device according to the present invention will vary according to users' preferences, however, the size, shape, and quantity of the first and second disk depressions 31 and 43, the size of the space 47, the size of the fluid pumping holes 135, whether a cover 99 with a pumping arrangement is provided, the sizes of the groove 127 and tongue 129 and any other components of the seal 125 will ordinarily be selected so that cavitation will be avoided as fluid passes in through the fluid pumping holes, radially outwardly through the space, and out through the seal. In a successfully tested sample device:

the diameter of the first and second disks 23 and 35 was 18.25" (46.355 cm);

the outside diameter of the first and second disk depressions 31 and 43 was 16.75" (42.545 cm);

the radii of the bottoms of first and second disk depressions 31 and 43 where they met with the fluid pumping holes 135 was 0.300" (0.762 cm);

the centerline length of the first and second disk depressions 31 and 43 was 6.312" (16.032 cm);

the maximum and minimum width of the first and second disk depressions 31 and 43 is determined by the number of depressions, diameter of the discs and width of the ridges between the depressions. In the sample device, eighteen first disk depressions were provided and seventeen second disk depressions were provided;

the maximum depth of the first and second disk depressions 31 and 43 proximate radially outer ends of the depressions was 1.508" (3.830 cm);

the depth of the first and second disk depressions 31 and 43 proximate radially inner ends of the depressions 0.612" (1.554 cm);

the width of ridges 131 and 133 between of the first and second disk depressions 31 and 43 was 0.25" (0.635 cm);

the diameter of fluid pumping holes 135 was 0.600" (1.524 cm);

the height of the tongue 129 of the seal 125 in an axial direction of the device 21 was 0.200" (0.508 cm);

the width of the tongue 129 of the seal 125 in a radial direction of the device 21 was 0.235" (0.597 cm);

the depth of the groove 127 of the seal 125 in an axial direction of the device 21 was 0.260" (0.660 cm);

the width of the groove 127 of the seal 125 in a radial direction of the device 21 was 0.260" (0.660 cm);

the distance between the axially closest portions of the first and second disk inner sides 27 and 39 when installed was 0.005" to 0.008" (0.127 mm-0.203 mm);

walls of the depressions by the ridges 131 and 133 formed a 90° angle with surfaces defined by axially closest portions of the first and second disk inner sides 27 and 39 (not including the portions of the seal 125).

The testing device 21 is particularly useful in a method of testing a drive train or components within a marine propulsion system including one or more shafts, e.g., outer shaft 51 and contra-rotating inner shaft 53, in a fluid, such as for testing ability of the shafts to bear loads and of the prime mover 139 driving the shaft to drive the shafts under particular load conditions. The method includes mounting the first disk 23 on an output shaft such as the outer shaft 51. The first disk 23 comprises the first disk outer side 25 and the first disk inner side 27, and a plurality of first disk depressions 31 extending radially toward a first radially outer edge 33 of the first disk on the first disk inner side. The method further comprises positioning the second disk 35 that comprises a second disk outer side 37 and a second disk inner side 39 relative to the first disk 23, such as by mounting the second disk on an output shaft such as the inner shaft 53 (or, alternatively, positioning the second disk 35' on a single shaft 53' and fixedly mounting the first disk 23' to a stationary object, such as the hull 55' of the watercraft 19'). The first disk 23 and the second disk 35 are ordinarily coaxial. The second disk 35 comprises a plurality of second disk depressions 43 extending radially toward a second radially outer edge 45 of the second disk on the second disk inner side 39.

The first disk 23 and the second disk 35 are secured relative to each other such that the first disk inner side 27 faces the second disk inner side 39 and the first disk inner side and the second disk inner side define a space 47, and such that a first portion 121 of the first disk inner side radially inward of the first radially outer edge 33 and a second portion 123 of the second disk inner side radially inward of the second radially outer edge 45 define a seal 125 in fluid communication with the space 47.

At least one of the shafts 51 and 53 is turned in a first rotational direction. If the other one of the shafts rotates, it is turned in a second rotational direction opposite the first rotational direction. Fluid is caused to enter into a central region of the space 47 while turning the at least one of the output shafts in the first rotational direction, such as by a pumping action achieved by rotating one of the disks provided with cup-shaped members 109 by inlet holes 107 on an inlet cover 99 into a cavity 103 and then through fluid pumping holes 135 in the first disk 23, or by a siphoning action achieved as the result of centrifugal force forcing fluid radially outwardly and drawing fluid through fluid pumping holes in the first disk. Fluid that is caused to enter into the space 47 is thereafter drained through the seal 125.

In an embodiment of the method, the one or more shafts 51 and 53 are parts of a contra-rotating shaft arrangement, with the first disk 23 being secured to a radially outer propeller shaft 51 of the contra-rotating shaft arrangement, and the second disk 35 being on a radially inner propeller shaft 53 of the contra-rotating shaft arrangement. The radially inner output shaft 53 is turned in a second rotational direction opposite the first rotational direction, ordinarily but not necessarily while turning the radially outer output shaft 53 in the first rotational direction.

The axial distance at which the first disk 23 and the second disk 35 are secured relative to each other can be changed by removing or providing a shim 119 between the flange 87 of the first nut 75 and the wall of the first portion 95 of the first disk 23 to adjust a position of the first disk along the first nut, and/or providing a shim 215 between the flange 187 of the second nut 175 and the wall of the first portion 195 of the second disk 35 to adjust a position of the second disk along the second nut. Increasing or decreasing the size of the shims 119 and/or 215 can increase or decrease, respectively, the size of the space 47 between the second disk inner side 27 and the second disk inner side 39 of the second disk 35, as well as increasing or decreasing, respectively, the size of the seal 125.

It will be appreciated that altering geometry of the components of the device 21 including their relative spacing along the axes of the inner and outer shafts 51 and 53 will alter the amount of shear that is able to be produced as the first and second disks 23 and 35 are rotated. For example, reducing the angle formed between walls of the depressions by the ridges 131 and 133 with surfaces defined by axially closest portions of the first and second disk inner sides 27 and 39 would be expected to reduce the amount of shear produced. Increasing or decreasing the size of the distance between the axially closest portions of the first and second disk inner sides 27 and 39 of the disks 23 and 35 by the ridges 131 and 133 would also be expected to affect the amount of shear produced. Increasing or decreasing the number of first and second disk depressions 31 and 43 would also be expected to affect the amount of shear produced.

Mapping out and quantifying the performance of the device 21 for, e.g., different engine rpms and loads facilitates using the device to test the engine and drive train to see if they meet established parameters. Additionally, because no thrust is produced when rotating the shafts 51 and 53, the device 21 facilitates allowing users to provide a load and test an engine/drivetrain at a dock or in a test tank. Particularly in the case of a watercraft with one or multiple engines, not having to take it out to sea to test the engine and drive train will be expected to save money, fuel, wear and tear on the engine or engines, as well as wear and tear on the watercraft, and the cost to man the boat.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A testing device for testing a drive train or components within a marine propulsion system having at least one driven shaft, comprising:

a first disk comprising a first disk outer side and a first disk inner side, a first hole extending through a center of the first disk from the first disk outer side to the first inner side, and a plurality of first disk depressions extending radially toward a first radially outer edge of the first disk;

a second disk comprising a second disk outer side and a second disk inner side, a second hole extending through a center of the second disk from the second disk outer side to the second inner side, and a plurality of second disk depressions extending radially toward a second radially outer edge of the second disk; and means for securing the first disk and the second disk relative to each other such that the first disk inner side faces the second disk inner side and the first disk inner side and the second disk inner side define a space and one of the first disk and the second disk is secured to a respective one driven shaft of the at least one driven shaft, wherein a first portion of the first disk inner side radially inward of the first radially outer edge and a second portion of the second disk inner side radially inward of the second radially outer edge define a seal in fluid communication with the space.

2. The testing device as set forth in claim 1, wherein the securing means is adapted to secure the first disk and the second disk relative to each other at a range of distances so that a volume of the space is adjustable.

3. The testing device as set forth in claim 1, wherein the first hole and the second hole are at least partially non-circular.

4. The testing device as set forth in claim 1, comprising first disk ridges between first disk depressions and second disk ridges between second disk depressions.

5. The testing device as set forth in claim 1, wherein the securing means comprises a first splined nut assembly that extends through the first hole, and a second splined nut assembly that extends through the second hole.

6. The testing device as set forth in claim 5, wherein the at least one driven shaft comprises plural shafts forming part of a contra-rotating shaft arrangement, and wherein the first splined nut assembly is adapted to be secured to an outer propeller shaft of a contra-rotating shaft arrangement and the second splined nut assembly is adapted to be secured to an inner propeller shaft of the contra-rotating shaft arrangement.

7. The testing device as set forth in claim 1, wherein the seal is a labyrinth seal.

8. The testing device as set forth in claim 7, wherein the labyrinth seal comprises a groove radially inward from an outer edge and on an inner side of one of the first disk and the second disk, and a tongue radially inward from an outer edge and on the inner side of the other one of the first disk and the second disk.

9. The testing device as set forth in claim 1, wherein the first disk depressions and the second disk depressions are teardrop-shaped.

10. The testing device as set forth in claim 9, wherein there are a different number of first disk depressions than second disk depressions.

11. The testing device as set forth in claim 1, comprising a pump arranged to pump fluid into the space.

12. The testing device as set forth in claim 11, comprising at least one fluid pumping hole extending between the first disk outer side and the first disk inner side, the at least one fluid pumping hole being disposed radially outward of the first hole.

13. The testing device as set forth in claim 12, wherein the pump comprises at least one conduit having a first end that faces in a direction that is non-perpendicular to an axis of the first disk and a second end in fluid communication with the at least one fluid pumping hole.

14. The testing device as set forth in claim 12, wherein radially inner ends of the first disk depressions extend toward the first hole at least to a radially outermost point of the at least one fluid pumping hole.

15. The testing device as set forth in claim 14, wherein at least one fluid pumping hole corresponds to each of the first disk depressions.

16. The testing device as set forth in claim 15, wherein the pump comprises a manifold in fluid communication with each fluid pumping hole.

17. A method for testing a drive train or components within a marine propulsion system having at least one driven shaft, comprising:

securing a first disk on one output shaft of the at least one driven shaft, the first disk comprising a first disk outer side and a first disk inner side, and a plurality of first disk depressions extending radially toward a first radially outer edge of the first disk on the first disk inner side;

positioning a second disk comprising a second disk outer side and a second disk inner side relative to the first disk, the first disk and the second disk being coaxial, the second disk comprising a plurality of second disk depressions extending radially toward a second radially outer edge of the second disk on the second disk inner side;

securing the first disk and the second disk relative to each other such that the first disk inner side faces the second disk inner side and the first disk inner side and the second disk inner side define a space, and such that a first portion of the first disk inner side radially inward of the first radially outer edge and a second portion of the second disk inner side radially inward of the second radially outer edge define a seal in fluid communication with the space;

turning the one output shaft in a first rotational direction;

causing fluid to enter into a central region of the space while turning the output shaft in the first rotational direction; and draining fluid that is caused to enter into the space through the seal.

18. The method as set forth in claim 17, comprising changing an axial distance at which the first disk and the second disk are secured relative to each other.

19. The method as set forth in claim 17, wherein the at least one driven shaft comprises plural shafts forming part of a contra-rotating shaft arrangement, the first disk being secured to an outer propeller shaft of the contra-rotating shaft arrangement, the method comprising mounting the second disk being on an inner propeller shaft of the contra-rotating shaft arrangement, and turning the radially inner output shaft in a second rotational direction opposite the first rotational direction.

20. The method as set forth in claim 19, comprising turning the radially inner output shaft in the second rotational direction while turning the radially outer output shaft in the first rotational direction.

* * * * *